United States Patent
Smith et al.

(10) Patent No.: US 9,922,756 B1
(45) Date of Patent: Mar. 20, 2018

(54) ELECTRICAL CABLES WITH NON-METALLIC JACKETS AND METHODS OF FABRICATING THE SAME

(71) Applicant: Encore Wire Corporation, McKinney, TX (US)

(72) Inventors: David K. Smith, McKinney, TX (US); William T. Bigbee, Jr., Bonham, TX (US); Jose D. Garza, McKinney, TX (US); Mark D. Bennett, Ravenna, TX (US)

(73) Assignee: Encore Wire Corporation, McKinney, TX (US)

(*) Notice: Subject to any disclaimer, the term of this patent is extended or adjusted under 35 U.S.C. 154(b) by 644 days.

(21) Appl. No.: 14/328,950

(22) Filed: Jul. 11, 2014

Related U.S. Application Data

(62) Division of application No. 12/284,660, filed on Sep. 24, 2008.

(60) Provisional application No. 61/002,102, filed on Nov. 6, 2007.

(51) Int. Cl.
*H01B 13/14* (2006.01)
*H01B 7/08* (2006.01)

(52) U.S. Cl.
CPC ......... *H01B 13/144* (2013.01); *H01B 7/0823* (2013.01)

(58) Field of Classification Search
CPC ................. H01B 13/14–13/148; H01B 7/0823
See application file for complete search history.

(56) References Cited

U.S. PATENT DOCUMENTS

| | | |
|---|---|---|
| 3,013,109 A | 12/1961 | Gorman |
| 3,502,791 A | 3/1970 | Dahlstrom |
| 3,800,065 A | 3/1974 | Bunish et al. |
| 3,865,972 A | 2/1975 | Norris |
| 4,487,997 A | 12/1984 | Ditchfield |
| 5,689,090 A | 11/1997 | Bleich et al. |
| 6,870,105 B2 | 3/2005 | Maydanich et al. |
| 7,129,415 B1 | 10/2006 | Bates et al. |
| 7,514,632 B2 | 4/2009 | Lin |

FOREIGN PATENT DOCUMENTS

JP 57092316 U * 6/1982

OTHER PUBLICATIONS

Partial machine translation of JPS57-92316U, obtained Apr. 3, 2017.*

* cited by examiner

*Primary Examiner* — Livius R Cazan
(74) *Attorney, Agent, or Firm* — Warren Rhoades LLP

(57) ABSTRACT

An electrical cable having a plurality of conductors including a grounding conductor and at least one power-carrying conductor. The plurality of conductors disposed approximately in parallel within an outer jacket such that the electrical cable has a substantially elongated horizontal cross-section.

16 Claims, 5 Drawing Sheets

ELECTRICAL CABLES WITH NON-METALLIC JACKETS AND METHODS OF FABRICATING THE SAME

CROSS-REFERENCE TO RELATED APPLICATION

The present application is a division of U.S. Non-provisional application Ser. No. 12/284,660, filed Sep. 24, 2008, now abandoned, and claims the benefit of U.S. Provisional Application Ser. No. 61/002,102, filed Nov. 6, 2007.

FIELD OF INVENTION

The present invention relates in general to electrical cables and methods of their manufacture, and in particular to electrical cables with non-metallic jackets and methods of fabricating the same.

BACKGROUND OF INVENTION

Many building applications require electrical cables consisting of three insulated conductors and a bare ground conductor, preferably copper, all of which are surrounded by a non-metallic sheath or jacket. Underwriters Laboratories (UL) Standard 719, for example, defines such cables under the general designation "NM" for non-metallic sheathed cables, and the particular designation "NM-B" for building wire with a non-metallic sheath. The NM-B type of electrical cable is widely used in the building and construction industry, including for the new construction and remodeling of single-family housing and apartment-type residences.

There are at least two common NM and NM-B cable constructions using three insulated conductors and a bare ground. In what is typically known as a "round" construction, the inner insulated conductors and the associated bare ground conductor are "cabled" on a machine to produce a single inner construction in which all of the conductors are twisted together with a preferred lay-length and diameter. The bare ground wire is normally wrapped in a paper sheath, as can be the entire inner assembly of the twisted-together insulated and bare conductors. These "tabled" inner conductors are jacketed with a polyvinyl chloride (PVC) resin outer jacket to produce the finished cable.

Cabling gives the inner conductors a uniformly tight, rounded construction that holds up well for the final jacketing application. It also gives the finished cable a uniformly round appearance. Cabled inner conductors also inherently protect against possible movement, loosening, and ensuing damage of the individual conductors as they pass through capstans, dies, and paper folders during the various manufacturing phases. However, cabling the inner conductors disadvantageously adds labor-intensity and cost to the manufacturing process in comparison to other methods of construction.

The second typical type of construction of three conductor with bare ground NM and NM-B type electrical cables is the "bundled" construction. In the bundled construction, the inner insulated conductors and ground wires are not uniformly cabled. Instead the insulated conductors and bare grounding wires are randomly bundled, and sometimes intermittently twisted, in a quasi-rounded, or roughly square or diamond shaped fashion. A helical binder cord may or may not be used prior to the jacketing process. The bare ground wire and the entire inner construction are wrapped in paper before jacketing.

Bundling the inner conductors is more cost effective than cabling since certain aspects of the cabling process are eliminated during manufacture. However, bundling poses a number of other problems. During the jacketing, the individual conductors, which are not tightly cabled by twisting, can intermittently overlap or misalign. Additionally, the individual inner conductors can unpredictably and non-uniformly move and compete for space on capstans, in paper folders, or in dies, which can damage, crush, kink, or otherwise compromise the integrity of the current-carrying conductors and ground wires. The bundled inner conductors are also less uniform in appearance and assembly than cabled inner conductors.

Furthermore, the appearance of the outer finished jacket surrounding non-parallel, randomly bundled inner conductors can in turn be non-uniform and unpredictable. This can create problems during installation, since cables with inconsistently shaped outer jackets are difficult to pull through, under, or around joists, either alone or in conjunction with other wires. Bundle-constructed cables also create marketing and quality control problems, since production personnel and end users sometimes mistakenly associate an inconsistent non-uniform outer aesthetic of a finished product with manufacturing defects.

Hence, a need exists for new electrical cables and methods of their manufacture that address the foregoing problems with conventional cabled and bundled electrical cables with non-metallic sheaths. In addition to addressing these problems, such electrical cables and manufacturing methods should meet the requirements of the relevant NM and NM-B type electrical cable standards, particularly those related to electrical cables with three insulated conductors and a bare ground wire.

SUMMARY OF INVENTION

The principles of the present invention are embodied, in one exemplary embodiment, in an electrical cable having a plurality of conductors including a grounding conductor and at least one power-carrying conductor. The plurality of conductors are disposed approximately in parallel within an outer jacket such that the electrical cable has a substantially elongated horizontal cross-section.

Generally, the principles of the present invention provide for electrical cables having finished jacket and overall appearance that are uniform, and non-round. Moreover, by avoiding the cabling step, the cost and labor intensity of the manufacturing process are substantially reduced. Advantageously, such electrical cables can be constructed using standard type pay-offs with reels or stems that supply both insulated and bare copper conductors to a conventional extruding head receiving a steady supply of jacketing compound.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1:
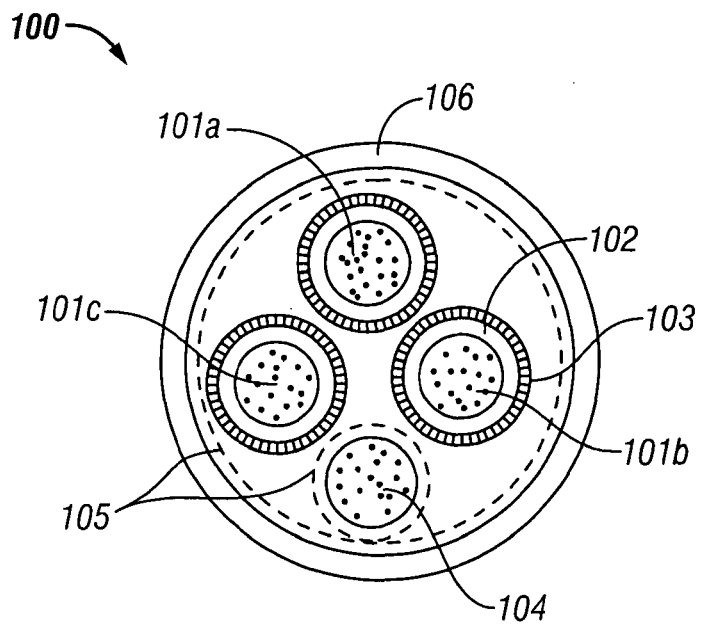
FIG. 1 is cross-sectional diagram of a prior art electrical cable with a non-metallic sheath and cabled inner conductors.

FIG. 1 is a diagram of a cross-section of a conventional finished three (3) conductor with ground NM or NM-B type electrical cable 100 having a round construction with cabled inner conductors. In cable 100, three (3) insulated conductors 101a, 101b, and 101c, preferably of copper, are each constructed with an insulation layer 102, preferably of polyvinyl chloride (PVC) resin and sheathed with a conductor jacket 103, preferably of nylon.

Ground conductor 104 is wrapped in a filler-type sheath 105, preferably paper, as is the entire internal construction. Surrounding insulated conductors 101a, 101b, and 101c, ground conductor 104, and fillers 105 is a non-metallic jacket 106. All four interior conductors (i.e. insulated conductors 101a, 101b, and 101c, and ground conductor 104) have been "cabled," which gives a round shape to the profile of cable 100.

Figure 2A:
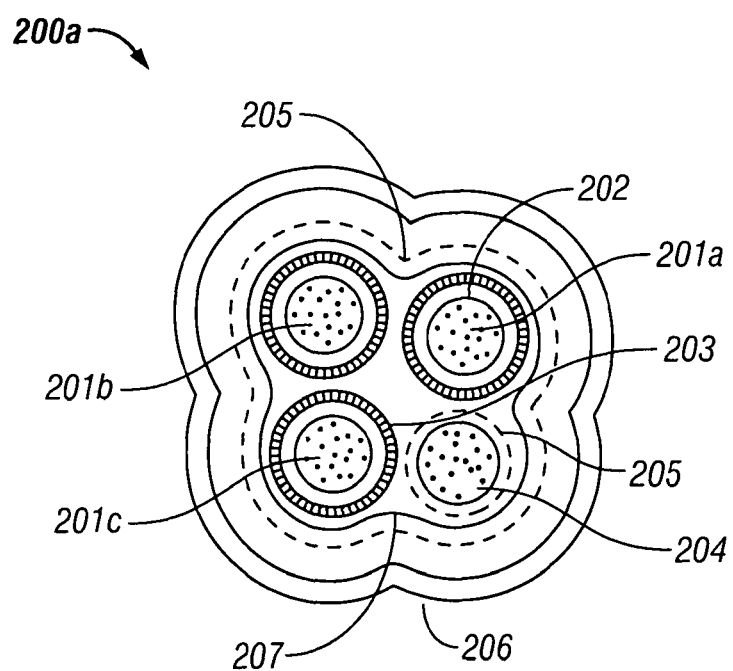
FIGS. 2A and 2B are cross-sectional diagrams of prior art electrical cables with non-metallic sheaths and bundled inner conductors, respectively with and without binding cord.

FIG. 2A depicts a cross-section of a conventional finished three (3) conductor with ground NM or NM-B type electrical cable 200a in which the inner conductors have been bundled in a quasi-rounded, diamond, or square stacked formation, with a binder cord.

In cable 200a, three (3) insulated conductors 201a, 201b, and 201c, preferably of copper, are constructed with an insulation layer, preferably of polyvinyl chloride (PVC) resin 202 and sheathed with a conductor jacket 203, preferably of nylon. Ground conductor 204 is wrapped in a filler-type sheath 205, preferably paper, as is the entire bundle of insulated conductors 201a, 201b, and 201c and ground conductor 204. Surrounding insulated conductors 201a, 201b, and 201c, ground conductor 204 and fillers 205 is non-metallic jacket 206. All four (4) interior conductors (e.g. insulated conductors 201a, 201b, and 201c, and ground conductor 204) in cable 200a are held together by a binding cord 207, which gives cable 200a a more or less rounded profile.

Figure 2B:
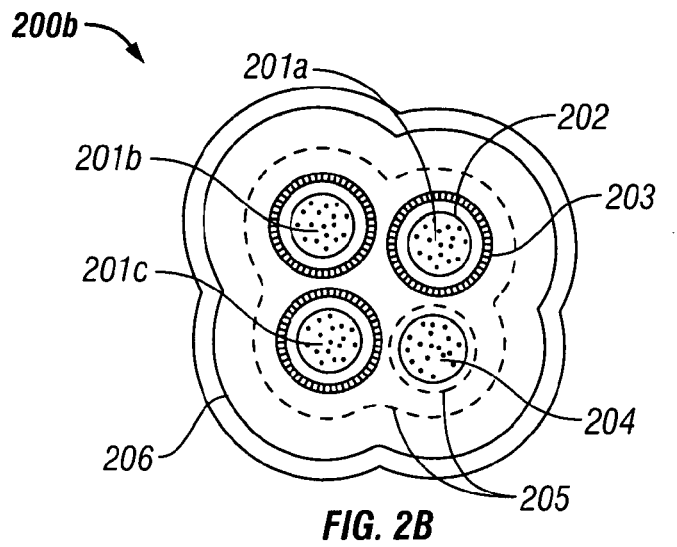

FIG. 2B illustrates an alternate conventional bundled cable 200b, which is similar to cable 200a discussed above, except that bundled cable 200b does not utilize a binder cord.

Figure 3A:
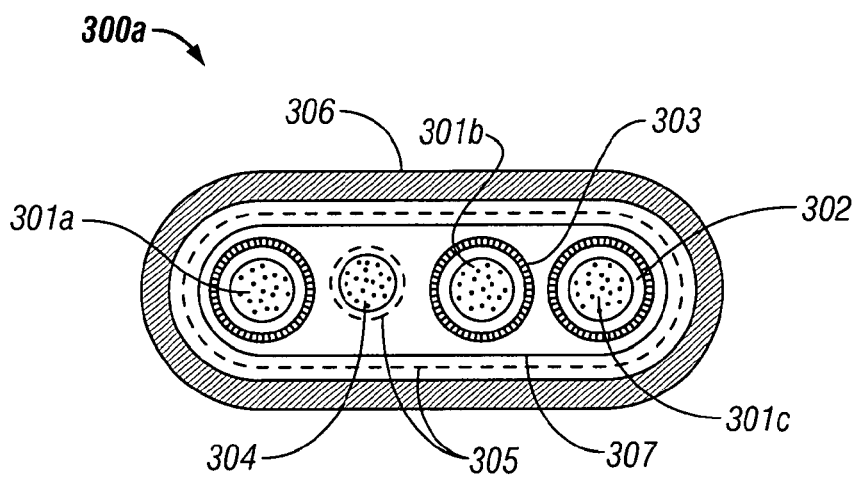
FIGS. 3A and 3B are cross-sectional diagrams of representative non-metallic sheathed cables embodying the principles of the present invention, respectively with and without binding cord.

A first illustrative embodiment of the principles of the present invention is electrical cable 300a shown in the cross-sectional diagram of FIG. 3A. Generally, electrical cable 300a comprises a finished three (3) conductor with ground NM-B type electrical cable with a parallel construction in which the inner conductors are all held approximately parallel to each other with a binder cord before the execution of paper barriers and the overall jacket.

The overall horizontal cross-section of cable 300a is elongated, providing two (2) generally flat major sidewalls and two (2) generally rounded lateral edges.

Specifically, cable 300a includes three (3) insulated conductors 301a, 301b, and 301c, preferably of copper, each constructed with an insulation layer 302, preferably of polyvinyl chloride (PVC) resin and sheathed with a conductor jacket 303 preferably of nylon. The ground conductor 304 is wrapped in a filler-type sheath 305, preferably paper, as is the entire construction prior to the final jacket. Surrounding the insulated conductors 301a, 301b, and 301c, ground conductor 304, and fillers 305 is non metallic jacket 306, preferably of PCV resin. All four (4) conductors (i.e. insulated conductors 301a, 301b, and 301c and ground conductor 304) have been laid approximately parallel to each other and wrapped in a binding cord 307, which gives an oval, parallel profile to electrical cable 300a.

Figure 3B:
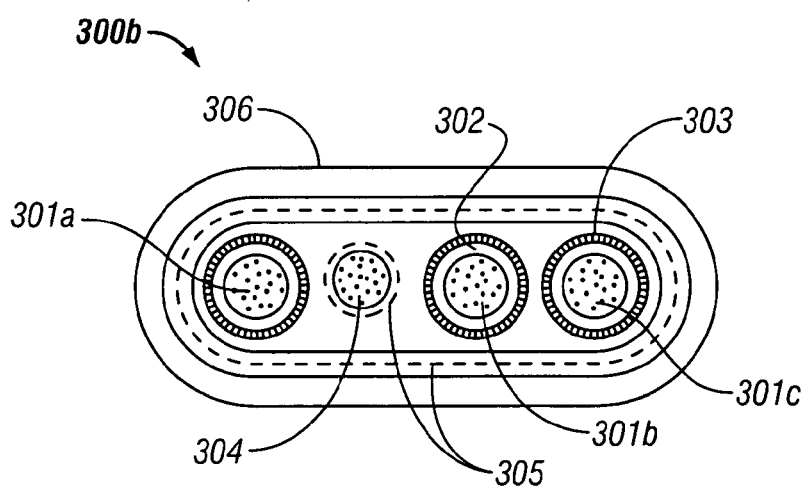

FIG. 3B illustrates a second exemplary electrical cable 300b embodying the present inventive principles. Electrical cable 300b is a finished three (3) conductor with ground NM or NM-B type electrical cable with a parallel construction similar to electrical cable 300a, with the exception that the inner conductors (i.e. insulated conductors 301a, 301b, and 301c, and ground conductor 304) have all been placed parallel to each other without a binder cord before the execution of paper barriers 305 and overall jacket 306.

Figure 4A:
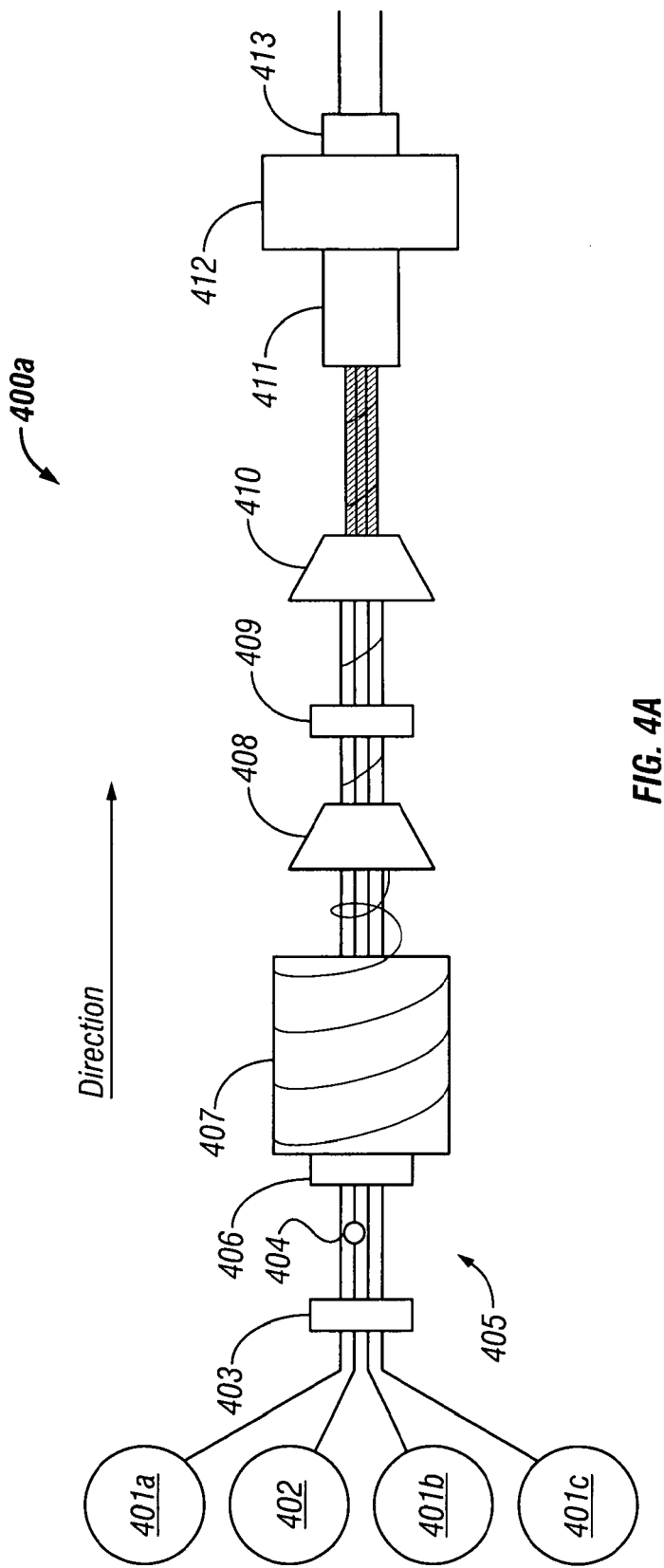
FIG. 4A is a diagram illustrating a representative process according to the principles of the present invention for fabricating the electrical cable of FIG. 3A.

An illustrative fabricating system 400a, according to the principles of the present invention and suitable for fabricating electrical cable 300a of FIG. 3A, is shown in FIG. 4A. (The process of fabricating electrical cable 300a is not, however, limited to fabricating system 400a; alternate fabrication systems and methods may be used, as appropriate.)

Fabricating system 400a includes supply stations or pay-offs 401a, 401b, and 401c supplying insulated conductors 301a, 301b, and 301b, and supply station or pay-off 402 supplying bare ground wire 304. All conductors pass through various primary stages of alignment by way of conventional conduits, capstans, or pulleys (not shown) before passing through a guide plate 403. Guide plate 403 gives a more exacting alignment of all the conductors 301a, 301b, 301c, and 304, especially such that bare ground conductor 304 alone passes through first paper folder 404, which surrounds ground conductor 304 with paper (filler) 305. An additional paper separator apparatus 405 underneath prevents the ground wire paper from becoming entangled with the moving conductors.

After the ground wire 304 has been wrapped in paper, all four conductors 301a, 301b, 301c, and 304 pass through a guide plate 406 before passing through the center of the cone of binder twine apparatus 407, which helically wraps binder twine 307 around insulated conductors 301a, 301b, 301c, and paper covered bare ground wire 304, along the entire length of the construction.

After receiving the binder twine, all conductors 301a, 301b, 301c, and 304 pass through a binder-twine and paper separator apparatus 408 before passing through guide plate 409. All conductors 301a, 301b, 301c, and 304 then pass through a second paper folder 410, which allows for paper sheath 305 to be applied and completely surround the entire construction. The entire paper-covered construction passes through a parallel-type retainer 411 and parallel-type extrusion tip 412 and die 413 at the extruder head, which forms the external jacket 306. A typical embossing wheel, laser printer, cooling trough, and take-up (not shown) complete the process.

Figure 4B:
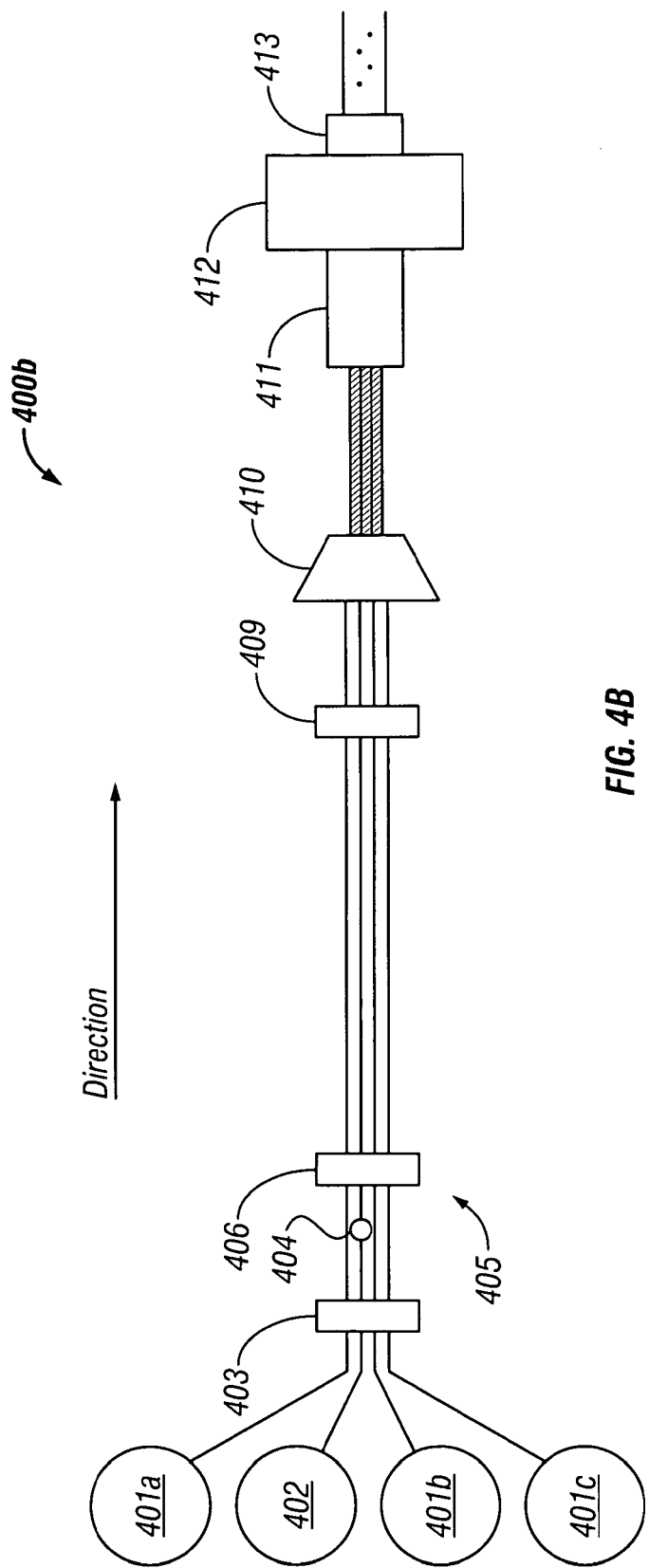
FIG. 4B is a diagram illustrating a representative process according to the principles of the present invention for fabricating the electrical cable of FIG. 3B.

FIG. 4B illustrates a second fabrication system 400b, suitable for manufacturing electrical cable 300b, which does not utilize binding twine. Fabrication system 400b is similar to fabrication system 400b, with the exception that binder twine apparatus 407 and paper separator apparatus 408 are no longer required (alternate techniques may be used, as appropriate, to construct cable 300b).

Figure 5:
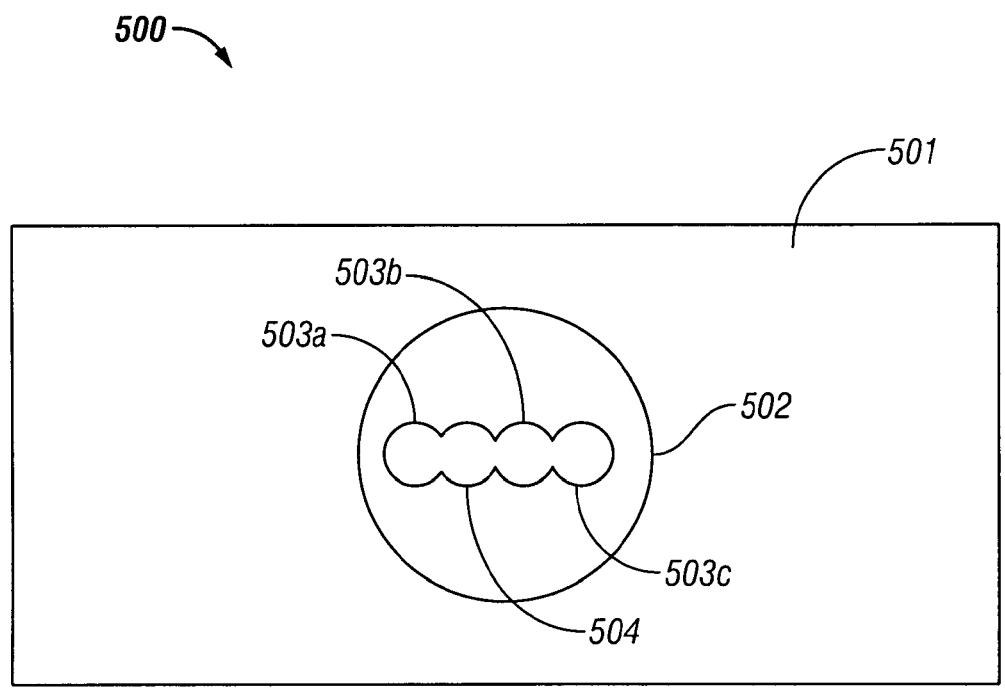
FIG. 5 is a diagram of an exemplary guide plate suitable or use in the processes shown in FIGS. 4A and 4B.

FIG. 5 is a diagram of an exemplary guide plate 500 suitable for use in the processes shown in FIGS. 4A and 4B as any or all of guide plate 403, guide plate 406, and guide plate 409. Guide plate 500 includes generally flat metal plate or bracket 501 supporting a removable guide die 502. Guide die 502 includes three (3) slots 503a-501b for guiding insulated conductors provided by payoffs 401a-401c and a slot 504 for guiding the bare grounding conductor provided by payoff 402. (In the illustrated embodiment slots 503a-503c overlap to form a single aperture, although this is not a requirement for alternate embodiments.) Guide die 502 directs the insulated and bare conductors generally in parallel such that the ultimate cable 300a/300b can be formed without twisting or cabling.

The embodiments of the principles of the present invention realize substantial advantages over the prior art. Among other things, since cabling is not performed on the inner conductors, the manufacturing process is streamlined, thereby increasing efficiency and reducing costs relative to conventional cabled conductor fabrication techniques. Furthermore, in contrast to conventional bundled electrical cables, the present principles provide for more aesthetically uniform electrical cables, which reduces the possibility that non-defective cables will be mistakenly perceived as defective. Functionally, horizontally elongated electrical cables according to the inventive principles are easier to pull over or through building structures, such as joints, and the substantially flat major sidewalls essentially allow for the stacking of multiple cables by the end user.

Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of fabricating an electrical cable, the electrical cable including a plurality of insulated conductors and a bare conductor disposed approximately in parallel within an outer jacket such that the electrical cable has an elongated horizontal cross-section, comprising:
   parallelizing the insulated conductors and the bare conductor by feeding the plurality of insulated conductors and the bare conductor through at least one guide plate; and
   extruding the outer jacket over the parallelized insulated and bare conductors such that the electrical cable has the elongated horizontal cross-section;
   wherein parallelizing comprises:
      passing the insulated conductors and the bare conductor through a first guide plate;
      surrounding the bare conductor with a paper sheath; and
      passing the insulated conductors and the paper-sheathed bare conductor through a second guide plate.

2. The method of claim 1, further comprising surrounding the parallelized insulated and bare conductors with a paper sheath prior to extruding.

3. The method of claim 1, further comprising surrounding the parallelized insulated conductors and the bare conductor with binding twine prior to extruding.

4. A method of fabricating an NM-type electrical cable:
   passing a plurality of insulated conductors and a bare conductor through a first guide plate to parallelize the plurality of insulated conductors and the bare conductor;
   passing the bare conductor through a paper folder to wrap the bare conductor with paper;
   passing the insulated conductors and the paper-wrapped bare conductor through a second guide plate to parallelize the insulated conductors and the paper-wrapped bare conductor;
   passing the parallelized insulated and paper-wrapped bare conductors through a paper folder to wrap the parallelized insulated and paper-wrapped bare conductors with paper; and
   extruding a jacket around the paper-wrapped parallelized insulated and paper-wrapped bare conductors to produce an NM-type cable having a generally elongated horizontal cross-section with the insulated and the paper-wrapped bare conductors disposed generally in parallel within the jacket without cabling or bundling.

5. The method of claim 4, further comprising:
   prior to passing the parallelized insulated and paper-wrapped bare conductors through the paper folder, wrapping a binding cord around the parallelized insulated and paper-wrapped bare conductors.

6. The method of claim 5, wherein wrapping a binding cord around the parallelized insulated and paper-wrapped bare conductors comprises:
   passing the parallelized insulated and paper-wrapped bare conductors through a binder twine application stage for helically winding the binder twine around the parallelized insulated and paper-wrapped bare conductors; and
   passing the twine-wrapped parallelized insulated and paper-wrapped bare conductors through a twine-paper separator stage.

7. The method of claim 4, wherein extruding a jacket around the paper-wrapped parallelized insulated and paper-wrapped bare conductors comprises:
   passing the paper-wrapped parallelized insulated and paper-wrapped bare conductors through a parallel retainer;
   passing an assembly exiting the parallel retainer through a parallel-type extrusion tip; and
   passing an assembly exiting the parallel-type extrusion tip through an extrusion die to produce the NM-type cable.

8. The method of claim 4, wherein passing the plurality of insulated conductors and a bare conductor through a first guide plate comprises passing each of the insulated conductors and the bare conductor through a corresponding one of a plurality of generally round apertures formed in parallel through a guide plate.

9. The method of claim 4, wherein passing the insulated conductors and the paper-wrapped bare conductor through a second guide plate comprises passing each of the insulated conductors and the paper-wrapped bare conductor through a corresponding one of a plurality of generally round apertures formed in parallel through a guide plate.

10. A method of fabricating an NM-type electrical cable:
parallelizing three insulated conductors and a bare conductor;
wrapping the bare conductor with paper;
parallelizing the three insulated conductors and the paper-wrapped bare conductor;
wrapping the parallelized three insulated and paper-wrapped bare conductors with paper to produce a paper-wrapped assembly; and
forming a jacket around the paper-wrapped assembly to produce an NM-type cable with a generally elongated horizontal cross-section with the three insulated conductors and the paper-wrapped bare conductor disposed generally in parallel without bundling or cabling.

11. The method of claim 10 wherein parallelizing the three insulated conductors and the bare conductor comprises passing the three insulated conductors and the bare conductor through a first guide plate.

12. The method of claim 10 wherein wrapping the bare conductor with paper comprises wrapping the bare conductor with a paper folder.

13. The method of claim 10, wherein parallelizing the three insulated and paper-wrapped bare conductors comprises passing the three insulated conductors and the paper-wrapped bare conductor through a guide plate.

14. The method of claim 10, wherein wrapping the parallelized three insulated and paper-wrapped bare conductors with paper to produce a paper-wrapped assembly comprise wrapping the parallelized three insulated and paper-wrapped bare conductors with a paper folder.

15. The method of claim 10, wherein forming a jacket around the paper-wrapped assembly comprises extruding plastic around the paper-wrapped assembly.

16. The method of claim 10, further comprising wrapping binding cord around the parallelized three insulated conductor and paper-wrapped bare conductors prior to wrapping the parallelized three insulated and paper-wrapped bare conductors with paper to produce the paper-wrapped assembly.

* * * * *